United States Patent
Kai et al.

(10) Patent No.: US 7,538,738 B2
(45) Date of Patent: May 26, 2009

(54) TAG-USE ANTENNA AND TAG USING THE SAME

(75) Inventors: Manabu Kai, Kawasaki (JP); Toru Maniwa, Kawasaki (JP); Takashi Yamagajo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 130 days.

(21) Appl. No.: 11/513,188

(22) Filed: Aug. 31, 2006

(65) Prior Publication Data

US 2007/0252770 A1 Nov. 1, 2007

(30) Foreign Application Priority Data

Apr. 26, 2006 (JP) .............................. 2006-122459

(51) Int. Cl.
*H01Q 9/26* (2006.01)
(52) U.S. Cl. ...................... 343/795; 343/802; 343/803; 343/806
(58) Field of Classification Search ................. 343/795, 343/802, 803, 804, 806, 895
See application file for complete search history.

(56) References Cited

U.S. PATENT DOCUMENTS

| | | | | |
|---|---|---|---|---|
| 2,724,053 | A * | 11/1955 | Davis | 343/803 |
| 4,736,207 | A * | 4/1988 | Siikarla et al. | 343/895 |
| 5,142,270 | A * | 8/1992 | Appalucci et al. | 340/572.3 |
| 6,285,342 | B1 * | 9/2001 | Brady et al. | 343/895 |
| 6,717,551 | B1 * | 4/2004 | Desclos et al. | 343/700 MS |
| 6,870,506 | B2 * | 3/2005 | Chen et al. | 343/700 MS |
| 6,999,028 | B2 * | 2/2006 | Egbert | 343/700 MS |
| 7,053,221 | B2 * | 5/2006 | Hedrick et al. | 548/181 |

(Continued)

FOREIGN PATENT DOCUMENTS

| | | |
|---|---|---|
| KR | 2001-0073147 | 7/2001 |
| WO | WO 00/16286 | 3/2000 |

OTHER PUBLICATIONS

Offical Communication from the Korean Intellectual Property Office, Notice of filing of written argument; Application No. 10-2006-88888; Oct. 18, 2007 with Eng. Translation.

(Continued)

*Primary Examiner*—Michael C Wimer
(74) *Attorney, Agent, or Firm*—Hanify & King, P.C.

(57) ABSTRACT

The present invention relates to a tag-use antenna allowing a miniaturization while maintaining a constant minimal change of a communication distance. The tag-use antenna has a feed part of a folded dipole antenna of a size of 53 mm long and 7 mm wide being connected to, and equipped with, an LSI chip of Rc=500 ohms and Cc=1.4 pF and is covered with plastic resin 13 of the dielectric constant $\epsilon r=3$ and thickness of $t=0.75$ mm on both sides of the antenna. The dipole part of 1 mm wire path width of the tag-use antenna is formed in a rectangular spiral by being bent inward from both ends at bending parts at four places. The entire length of the dipole antenna when extending the four bending parts straight is featured so as to be shorter than one half of a resonance wavelength of the antenna. An inductance part is featured in the intermediate part of the both dipole parts in the neighborhood of the center of the antenna. The inductance part is connected to the chip equipment part in parallel with the both dipole parts.

7 Claims, 8 Drawing Sheets

U.S. PATENT DOCUMENTS 7,202,790 B2 * 4/2007 Copeland et al. ......... 340/572.7
2005/0024287 A1 2/2005 Jo et al.

OTHER PUBLICATIONS

Antenna Engineering Handbook ( The Institute of Electronics, Information and Communication Engineers of Japan 1980) English version.

Antenna Engineering Handbook (The Institute of Electronics, Information and Communication Engineers of Japan 1980, pp. 112-115) Japanese Partial Translation version.

Official Communication from the Korean Patent Office; Application No. 10-2006-88888; May 8, 2008 with English Translation.

* cited by examiner

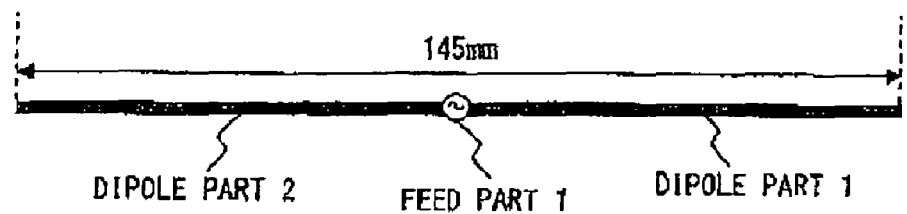
RELATED ART    F I G. 1 A
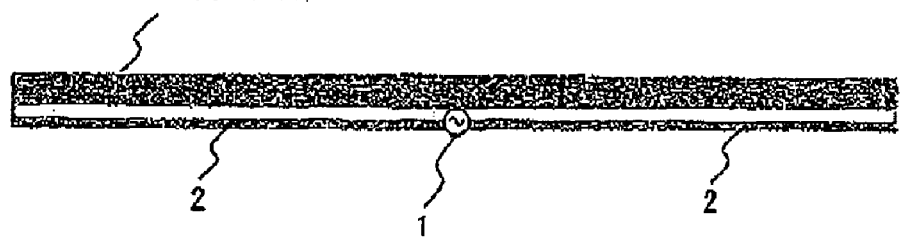
RELATED ART    F I G. 1 B
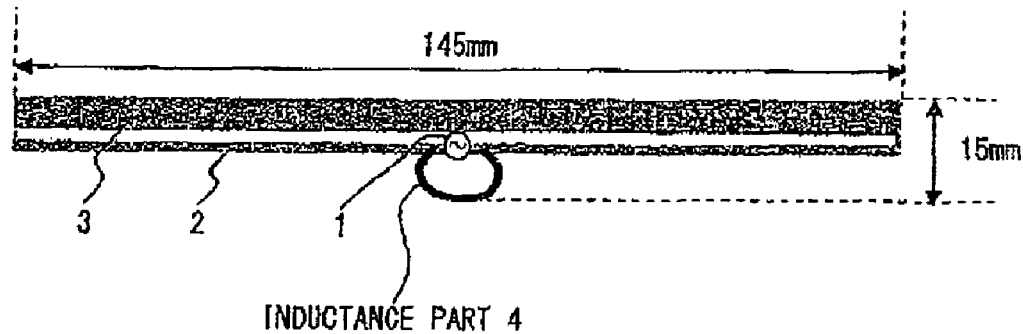
RELATED ART    F I G. 1 C

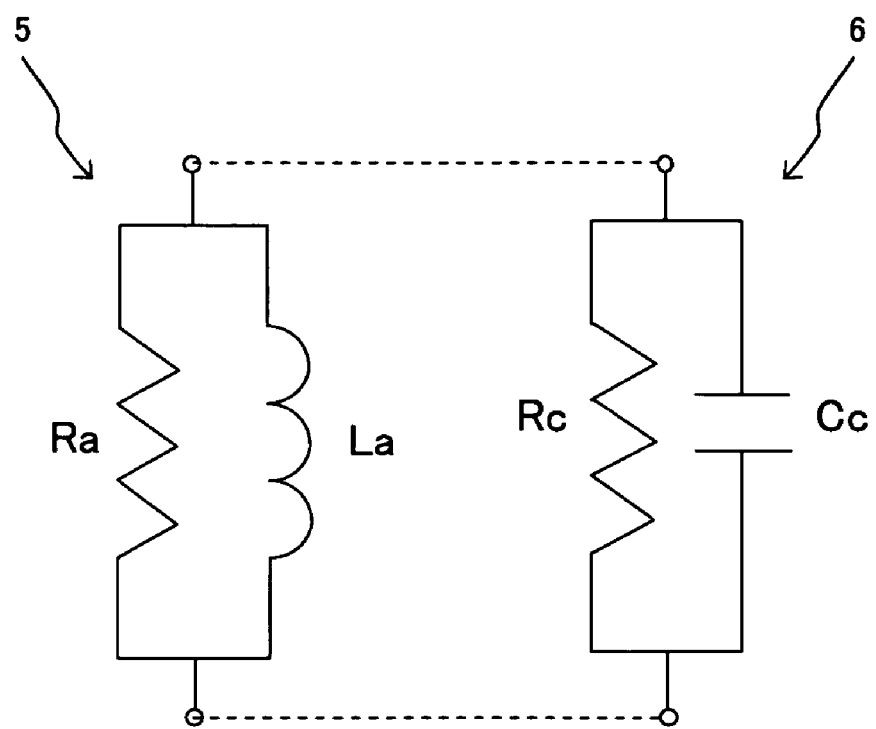
F I G. 2

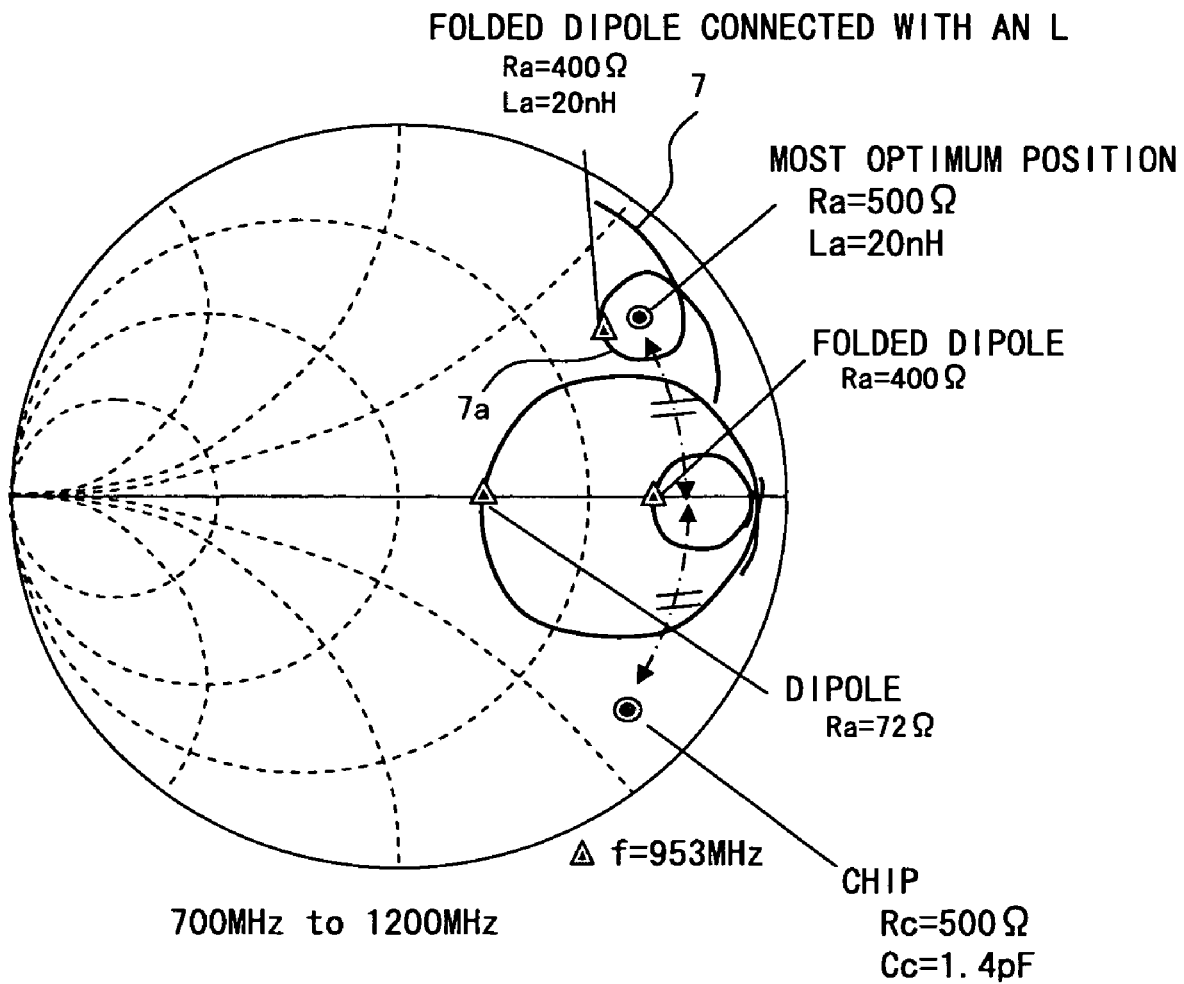
F I G. 3

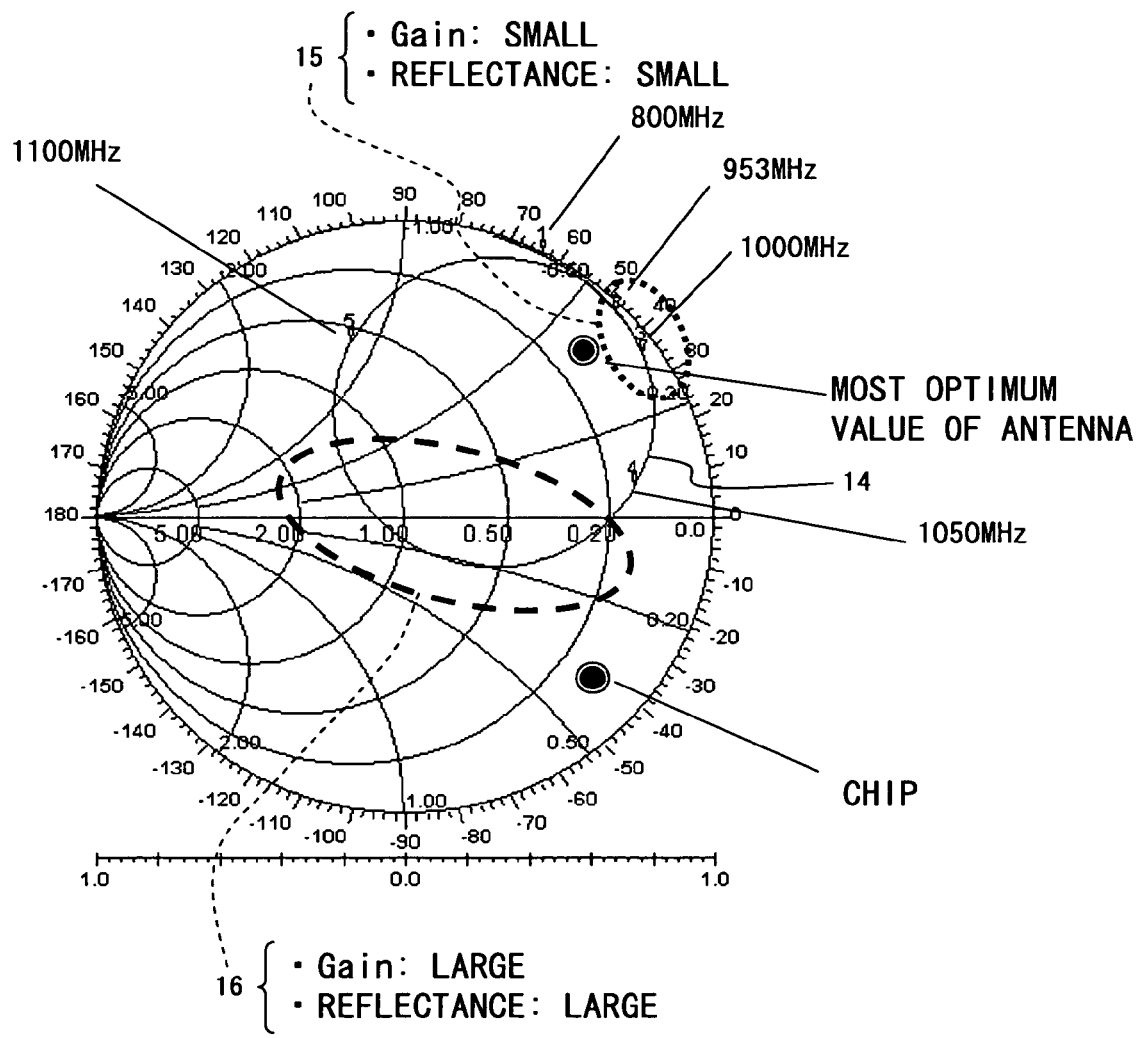
F I G. 5

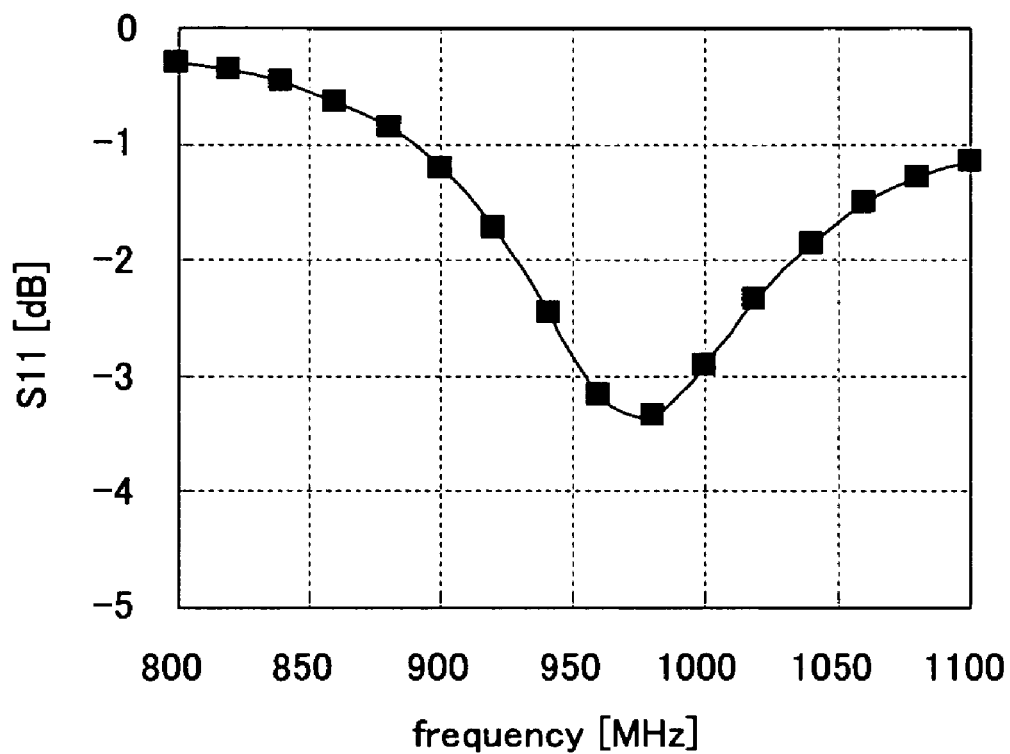
F I G. 6

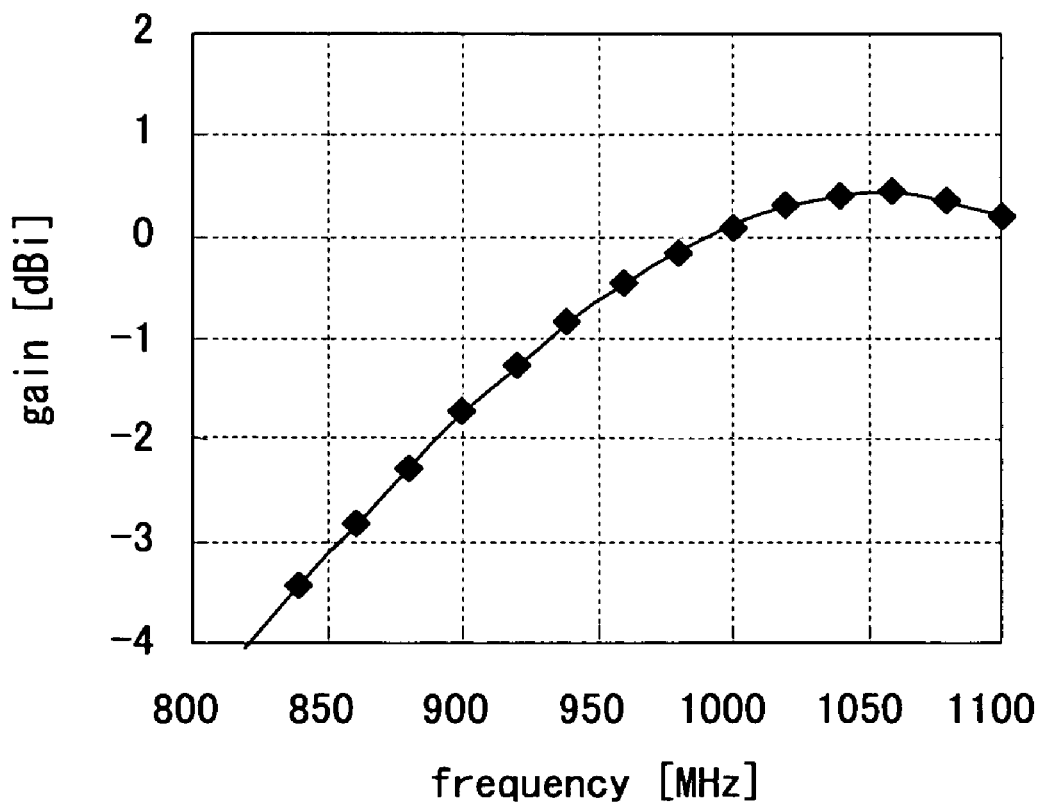
F I G. 7

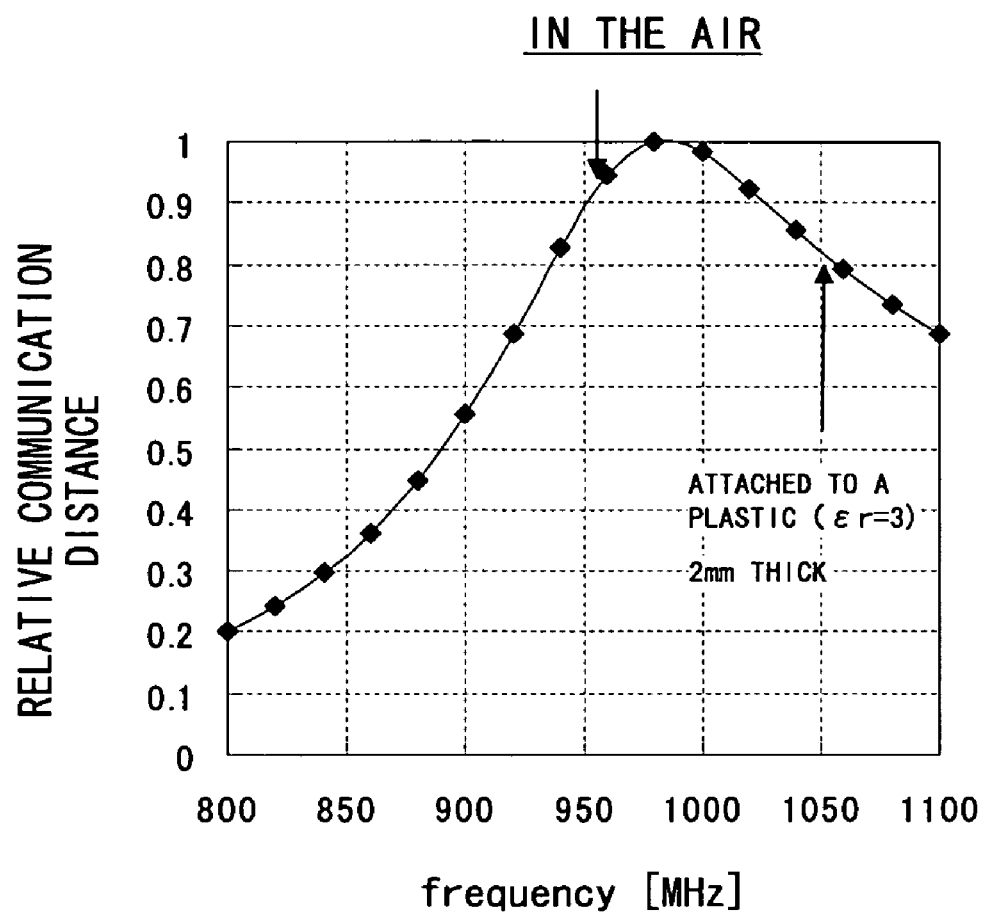
F I G. 8

TAG-USE ANTENNA AND TAG USING THE SAME

BACKGROUND OF THE INVENTION

1. Field of the Invention

The present invention relates to an ultra-miniature, tag-use antenna used for a large-scale integration (LSI) chip and a tag using it for use in a radio frequency identification (RFID) system which is capable of carrying out a communication between a reader/writer and a tag by using a radio high frequency signal.

2. Description of the Related Art

An RFID system is one for transmitting a signal of approximately one watt from a reader/writer (simply "RW" hereinafter), receiving the signal on a tag side and retransmitting a response signal back to the RW side, by using an ultra high frequency (UHF) between 860 MHz and 960 MHz, thereby enabling the RW to read information stored in the tag.

The tag is constituted by a tag-use metallic antenna formed on a flat surface such as a sheet or a film, et cetera, of approximately 0.1 mm thick, and an LSI chip connected to a feed point of the tag-use antenna. The LSI chip is usually smaller than a sesame seed, actually approximately 0.2 mm thick and its area size is approximately 1 mm square.

A communication distance between the RW and tag is about 3 to 5 m, depending on a gain of a tag-use antenna, an operation voltage of a LSI chip, and an environmental condition of the surrounding, et cetera.

FIGS. 1A, 1B and 1C are diagrams respectively describing tag-use antennas used for a conventional RFID system. FIG. 1A shows a tag-use antenna comprising dipole parts 2 extending horizontally on both sides of a power feed part 1; FIG. 1B shows one having folded dipole parts 3 having both ends of FIG. 1A turned back; and FIG. 1C shows one having an inductance part 4 connected in parallel with the dipole parts 2 to the feed part 1 shown in FIG. 1B.

FIG. 2 is a diagram showing an equivalent circuit of the tag-use antenna and LSI chip used for an RFID system, with the left side showing an equivalent circuit 5 of the tag-use antenna and the right side showing an equivalent circuit 6 of the LSI chip.

FIG. 3 is a diagram exemplifying an analysis, by an admittance chart, of a tag using a conventional tag-use antenna. An admittance chart is indicated by zero ("0") ohm on the left side of a pure resistance line, which divides the circle of the chart into the top and bottom half, and infinite ("∞") ohms on the right side thereof.

As shown in FIG. 2, a tag-use antenna can be equivalently expressed by a parallel connection of an emission resistance Ra and of an inductance La, while an LSI chip can be equivalently expressed by a parallel connection of a resistor Rc and of a capacitance Cc.

Then, the parallel connection of the tag-use antenna and LSI chip makes the inductance La and capacitance Cc resonate, and they match at a desired resonance frequency f0 as is apparent from an expression "$f0=1/(2\pi\sqrt{(LC)})$", resulting in a reception power at the tag-use antenna being adequately supplied to the LSI chip side.

That is, letting an emission resistance Ra of the tag-use antenna be 400 ohms for example, a resistance Rc of the LSI chip be 500 ohms, for example, a configuration be so as to cancel out resistance of both, and assuming L=La=20 nano Henry (abbreviated as "nH" hereinafter) and C=Cc=1.4 pF in the above noted expression of the resonance frequency, then a desired resonance frequency of f0=953 MHz required for an RFID system is obtained.

For a basic antenna used for a tag-use antenna, first conceivable is a dipole antenna of a whole length of about 145 mm which is constituted by dipole parts 2 extending horizontally in both direction of the feed part 1 shown by FIG. 1A.

In this configuration, the feed part 1 connected to the dipole parts 2 extracts a power from a signal received at the dipole parts 2 and feed the power to the LSI chip equipped on the feed part 1 and also transfers the signal per se to the LSI chip. The configuration of the dipole antenna actually measures an emission resistance Ra=72 ohms.

Incidentally, impedance of an LSI chip of the above noted resistance Rc=500 ohms and capacitance Cc=1.4 pF is indicated at a position diagonally on the right below in the direction of about "−40 degrees" of an ωC zone in the admittance chart (FIG. 3 shows the position simply by a circular plot pointed as "chip").

In this case, an optimum position, in the admittance chart, of the dipole antenna resonating with the above described LSI chip is a position of the LSI chip symmetrically reversed relative to the pure resistance line of the admittance chart, and FIG. 3 shows the position diagonally on the right above in the direction of about "+40 degrees" of an ωL zone.

This position is one for an impedance with an emission resistance Ra=500 ohms and an inductance La=20 nH (FIG. 3 shows the position by a circular plot indicating "the most optimum position").

As such, an emission resistance Ra required for an RFID tag-use antenna corresponding to an LSI chip of resistance Rc=500 ohms and capacitance Cc=1.4 pF is very high, i.e., about 500 ohms, and therefore the emission resistance Ra=72 ohms of the dipole antenna shown by FIG. 1A is far too small.

It is accordingly necessary to increase an emission resistance Ra up to about 500 ohms by devising a configuration of the dipole antenna. Then devised is a folded dipole antenna having a folded dipole part 3 of a whole length of 145 mm folding back from the both ends of FIG. 1A, as shown by FIG. 1B.

This configuration makes it possible to increase an emission resistance Ra. This configuration is known to allow setting of emission resistance in the range of about 300 to 1500 ohms, depending on a wire width of the folded part.

FIG. 3 shows an impedance position of a folded dipole with an emission resistance Ra being 400 ohms indicated by a triangle on the pure resistance line.

Here, with the emission resistance Ra being maintained at 400 ohms, a further connection of an inductance part 4 to the feed part 1 of FIG. 1B parallelly with the dipole part 2 as shown in FIG. 1C rotates the antenna characteristic counterclockwise on the admittance chart.

This results in positioning, close to the most optimized position, the antenna characteristic of the folded dipole antenna, connected with the inductance L, having a resonance frequency of 953 MHz as shown by a triangle as the folded dipole connected with the inductance L (the "L-connected folded dipole antenna" hereinafter) in the ωL zone of FIG. 3.

The admittance chart shown by FIG. 3 exemplifies characteristic between 700 and 1200 MHz. In the range of the resonance frequency, it is apparent that the antenna characteristic locus 7 of the L-connected folded dipole antenna circles around the resonance most optimum value (i.e., the most optimized position of Ra=500 ohm and La=20 nH).

That is, it is apparent that the configuration of the L-connected folded dipole antenna shown by FIG. 1C widens a frequency band resonating with the LSI chip.

Incidentally, an RFID is used by being attached to various bodies as a tag. In the case of such a body being a styrofoam, the dielectric constant εr of the RFID is approximately 1.1 which is about the same as the value in the air (εr=1).

That is, in the case of attaching a tag onto a styrofoam, it becomes about the same as floating the tag in the air.

In the case of a body attached with an RFID being a plastic for example, an effective dielectric constant around the antenna becomes large if the thickness of the plastic is 2 mm, since the dielectric constant εr of a plastic material is about εr=3.

Meanwhile, a behavior of the RW communicating with an RFID at the operating frequency 953 MHz is empirically known to be approximately the same as the characteristic at 953 MHz in the air displaced by 100 MHz.

As such, a practicality is hampered if a communication distance of the antenna fluctuates when being attached onto various kinds of bodies, that is, when the operating frequency is displaced, and therefore desired is an antenna whose communication distance does not change even if it is attached to various kinds of bodies.

Therefore, a good antenna for an RFID is one capable of having a wide frequency band characteristic, that is, having a wide frequency characteristic.

The L-connected folded dipole antenna, shown by FIG. 1C, comprising the antenna characteristic as shown in FIG. 3 has an adequately wide band, e.g., the bandwidth of the one rotation part 7a according to the antenna characteristic locus 7 of FIG. 3 is approximately 200 MHz, can be characterized as a good antenna whose communication distance being hard to fluctuate due to a material to be attached to (i.e., uninfluenced by a material to be attached to).

However, there is a strong demand by users for miniaturizing the RFID. An antenna with a size of 145 mm horizontal by 15 mm vertical is too large for a tag use. It may be just possible to use it for managing a book for example, while there is no degree of freedom by a limitation of its usage in terms of other practicalities, thus requiring further miniaturization.

Incidentally, if one tries to confine the entire size of an antenna to 80 by 20 mm for example, he must bend the antenna line in a serpentine fashion (or "meandering") in order to house the elongated line length into a small area size.

It is, however, known that a miniaturization of an antenna widens a frequency interval (e.g., the one rotation bandwidth becomes approximately a mere 20 MHz) of the characteristic part (i.e., the characteristic locus 7a) that rotates one revolution as shown in FIG. 3.

That is, the miniaturization of an antenna narrows a frequency band. In other words, an RFID comprising such miniaturized antenna changes communication distances drastically depending on the material to be attached to. This is faced with practical problems.

SUMMARY OF THE INVENTION

A tag-use antenna according to the present invention is one comprising a dipole antenna, a feed part and an inductance part, which are featured by a conductor in the same flat plane, wherein the feed part is featured at the center of the dipole antenna in a manner capable of equipping with a chip, the inductance part is connected to the feed part in parallel with a dipole of the dipole antenna, and the dipole antenna is formed in a square spiral by being bent inward from both ends at bending parts which bend the dipole at least in four places respectively, with the entire length of each of the bending parts of the four places being shorter than one half of a resonance wavelength of the antenna when the bending parts are extended to a straight line.

The tag-use antenna is configured in such a manner that the inductance part is featured in the neighborhood of the center of the dipole antenna and placed in the middle of the dipole, which is formed in the square spiral, of the dipole antenna. The tag-use antenna is configured in such a manner that the entire length of the antenna and the inductance part are adjusted so as to make an impedance of a tag at a reader/writer operation frequency of 953 MHz come close to an antenna's most optimum value, for example. The conductor is either copper, silver or aluminum, for example.

The tag-use antenna is configured so that the feed part is connected to, and equipped with, a large scale integration (LSI) chip. In this case a configuration may be so as to sandwich the tag-use antenna by a plastic resin or paper from both surface of the tag-use antenna. In this case the plastic resin is preferably an ethylene terephthalate film.

A tag according to the present invention is configured to sandwich the tag-use antenna by plastic resin or paper from the both sides.

The present invention is contrived to enable a provision of an extremely compact, tag-use antenna of which a communication distance is changed little by a body on which the antenna is attached to, that is, the antenna maintaining a minimally changed communication distance, and of a tag using the tag-use antenna.

BRIEF DESCRIPTION OF THE DRAWINGS

FIGS. 1A, 1B and 1C are diagrams describing tag-use antennas used for a conventional RFID system;

FIG. 2 is a diagram showing an equivalent circuit of a tag-use antenna and of an LSI chip which are used for an RFID system;

FIG. 3 is a diagram exemplifying an analysis of a tag using a conventional tag-use antenna;

FIG. 5 is an admittance chart showing an impedance characteristic of a tag-use antenna according to an embodiment;

FIG. 6 is a diagram showing a reflectance frequency characteristic of a tag-use antenna calculated by an electromagnetic field simulator according to an embodiment;

FIG. 7 is a diagram showing a calculation value of an antenna gain of a tag-use antenna calculated by an electromagnetic field simulator according to an embodiment; and FIG. 8 is a communication distance characteristic chart which can obtain a reflectance characteristic and a gain characteristic of a tag-use antenna in an Excel chart according to an embodiment.

DESCRIPTION OF THE PREFERRED EMBODIMENTS

The following is a detailed description of the preferred embodiment of the present invention by referring to the accompanying drawings.

Figure 4B:
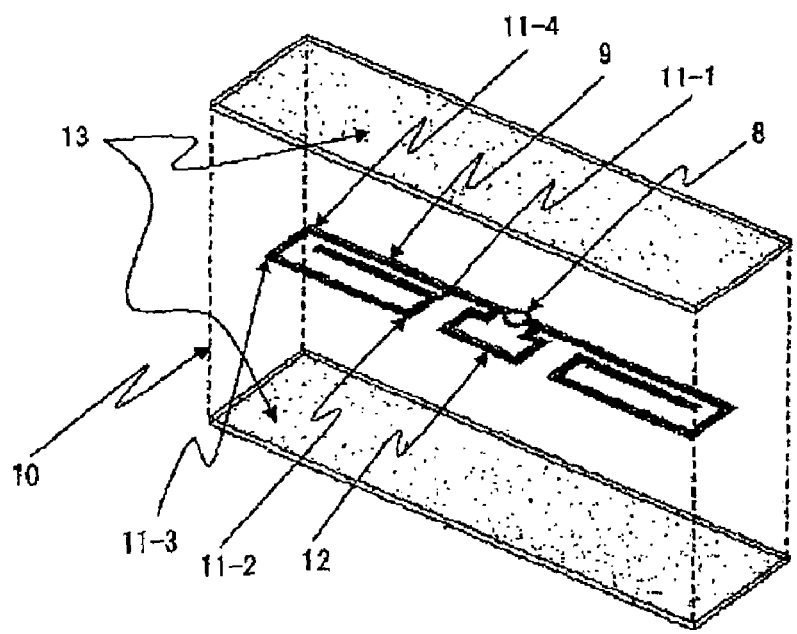
FIGS. 4A and 4B are diagonal view diagrams showing a configuration of an extremely compact tag-use antenna according to an embodiment.
Figure 4A:
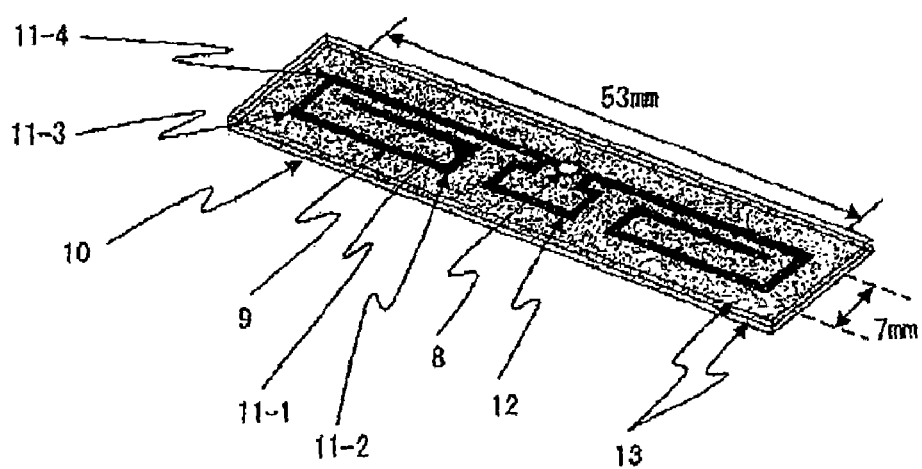

FIGS. 4A and 4B are diagonal view diagrams showing a configuration of an extremely compact tag-use antenna according to an embodiment. Note that FIGS. 4A and 4B shows a tag-use antenna along with a tag built in with the tag-use antenna. As shown in FIG. 4B is an enlarged version of FIG. 4A, in which a sandwich structure of the tag-use antenna was enhanced for viewing purpose. Here, the tag is configured by sandwiching both sides of the tag-use antenna by a plastic resin or paper. FIGS. 4A and 4B indicates a tag-use antenna internally by perspectively showing the plastic or paper tag.

The entire size of the tag-use antenna 10 shown in FIGS. 4A and 4B is 53 mm horizontal by 7 mm vertical.

The tag-use antenna 10 comprises a dipole antenna, a feed part and an inductance part which are featured by a conductor within the same plane. The conductor preferably uses copper, silver or aluminum.

The feed part is formed to enable an equipment of an LSI chip at the center of the dipole antenna and comprises a chip equipment part 8 as shown in FIG. 4A and 4B. With the chip equipment part 8 being at the center, the either side is featured a dipole part 9 of a line path width of 1 mm, thereby featuring a dipole antenna as the whole.

The dipole antenna constituted by the dipole part 9 on both sides is formed in a rectangular spiral by bending the dipoles inward from both sides at bending parts 11 (i.e., 11-1, 11-2, 11-3 and 11-4) in at least four places. That is, the present embodiment has four bending parts on each side.

The entire length of the dipole antenna is featured shorter than one half of a resonance wavelength of the antenna, as described later in detail, when the respective bending parts are extended in straight lines.

In the neighborhood of the dipole antenna is featured an inductance part 12 in the intermediate part of both dipole parts 9 and 9 which are respectively formed in the above described rectangular spirals. The inductance part 12 is connected to the chip equipment part 8, that is, the feed part of the antenna, parallelly with the both dipole parts 9 and 9.

The dipole antenna (i.e., the tag-use antenna 10) is comprised as a tag by connecting, and equipping, an LSI chip of Rc=500 ohms and Cc=1.4 pF, to and with the feed part (i.e., the chip equipment part 8), and both surfaces (i.e., the top and bottom surfaces in the showing of FIGS. 4A and 4B) are covered by plastic resin 13 of the dielectric constant $\epsilon r=3$ and thickness t=0.75 mm.

The plastic resin 13 uses an ethylene terephthalate film, et cetera, for example. Or, a suitable paper may be used for covering the both surfaces in place of the plastic resin 13.

FIG. 5 is an admittance chart showing an antenna characteristic of the tag-use antenna 10, that is, an impedance characteristic thereof. Note that the chip position and the most optimum position of the antenna in the showing of FIG. 5 are the same as the case of FIG. 8.

The admittance chart shown by FIG. 5 shows a locus 14 indicating an antenna characteristic as a result of inputting values of Ra, La, Rc and Cc of the tag-use antenna 10, as shown in FIG. 7, to a commercially available electromagnetic field simulator and calculating impedance in the frequency band between 800 and 1100 MHz.

The antenna characteristic locus 14 revolves around the most optimum value of the antenna, with the locus 14 being the closest thereto in the neighborhood of 953 to 1000 MHz of the RW operation frequency which is indicated by enclosing by the dotted line eclipse 15 in FIG. 5. That is, a reflectance between the LSI chip and dipole antenna is small.

Further increasing frequency so as to approach a position exceeding 1050 MHz indicated by a dotted line eclipse 16 in FIG. 5, a reflectance between the LSI chip and dipole antenna becomes large because it is far from the most optimum value of the antenna.

FIG. 6 is a diagram showing a frequency characteristic of a reflection S11 of the tag-use antenna 10 calculated by the above noted electromagnetic field simulator, showing frequencies (800 MHz through 1100 MHz) on the horizontal axis and reflections S11 (−5 dB to 0 dB) on the vertical axis.

As understood from FIG. 6, the reflection S11 indicates a minimum at around 975 MHz.

FIG. 7 is a diagram showing a calculation value of an antenna gain of the tag-use antenna 10 calculated by the above noted electromagnetic field simulator, showing frequencies (800 MHz through 1100 MHz) on the horizontal axis and antenna gains (−4 dBi through 2 dBi) on the vertical axis. The antenna gain shown in FIG. 7 indicates a maximum at around 1050 MHz.

That is, although there is a shortfall of the reflection becoming large at around 1050 MHz as shown in the admittance chart of FIG. 5, the antenna gain is large at around 1050 MHz as understood from FIG. 7, resulting in the large antenna gain compensating the shortfall of a large reflection.

FIG. 8 is a communication distance characteristic chart which can be obtained by combining the above noted reflectance characteristic and a gain characteristic of a tag-use antenna in an Excel chart, showing frequencies (800 MHz through 1100 MHz) on the horizontal axis and relative communication distances specified by a maximum distance on the vertical chart.

As described above, a communication distance characteristic possessed by the tag-use antenna 10 is asymmetrical in the left and right directions relative to the RW operation frequency of 953 MHz, with the gain changing gradually on the higher frequency side of the RW operation frequency of 953 MHz and a characteristic of being relatively stable communication distance.

The above noted calculation by the electromagnetic field simulator specifies the top and bottom of the plastic resin 13 shown in FIG. 4 as the air and therefore the communication distance at the RW operation frequency of 953 MHz is a distance when the tag-use antenna is in the air. The communication distance in the air is a distance of 0.95 as opposed to the specified maximum distance as shown in FIG. 8. That is, a 95% of the maximum distance is secured.

When attaching the tag-use antenna 10 to a plastic of $\epsilon r=3$ and 2 mm thick, an effective dielectric constant around the antenna becomes large, down-shifting a band approximately by 10%. That is, the waveform shown in FIG. 8 shifts toward lower frequency side by approximately 100 MHz.

In other words, the value of the relative communication distance at 1050 MHz, which is higher than 953 MHz by about 10% becomes a communication distance when attaching the tag-use antenna onto a 2 mm thick plastic according to the waveform shown in FIG. 8. The communication distance in this case is a distance of 0.8 as opposed to the specified maximum distance as shown in FIG. 8, securing 80% of the maximum distance.

As is also apparent from FIG. 8, the tag-use antenna 10 according to the present embodiment is configured to constantly secure within 80% of the maximum communication distance in the air, when being attached to a styrofoam or to a 2 mm plastic, and hence possess an extremely high, distance stability.

A remarkable characteristic of the tag-use antenna according to the present embodiment is that the antenna pattern constituted by the dipole part and inductance part is adjusted in a manner to approach the most optimum value of the antenna in the neighborhood of the RW operation frequency of 953 MHz, while reflectance becomes large as departing from the most optimum value in higher frequencies than 953 MHz, which is compensated by higher antenna gain, resulting in keeping the communication distance at a minimal loss.

In order to obtain higher antenna gains in higher frequency than 953 MHz, the entire length of the antenna is configured to be close to one half of the antenna resonance wavelength providing good gain efficiency.

The antenna pattern of the tag-use antenna 10 according to the present embodiment is remarkably characterized by configured in such a manner that the entire length of the antenna is a little shorter than one half of the antenna resonance wavelength λ when the bending parts 11 are extended straight.

The example shown by FIG. 4 is configured that the entire length of the antenna is approximately 120 mm when extending the bending parts straight, while one-half of the antenna resonance wavelength λ is approximately 130 to 140 mm, with the 10 mm tolerance band of the antenna resonance wavelength λ comprehending the plastic resin 13 on the top and bottom sides.

Meanwhile, the dipole part is maintained as straight as possible by bending from the side to inside, and the inductance part is desirably featured between both dipole parts because they are not to approach each other.

By this configuration, impedance at 953 MHz is set to approach the most optimum value of the antenna and to maximize the antenna gain in the neighborhood of 1050 MHz as shown in FIG. 5.

This configuration enables an accomplishment of a tag-use antenna possessing an extremely high distance stability always securing a distance within 80% of the maximum communication distance either in the air, or by being attached to a styrofoam or a 2 mm thick plastic.

Note that the present invention assumes that a size of the entire tag-use antenna (i.e., an L-connected dipole antenna) be 30 to 80 mm horizontal by 6 to 15 mm vertical.

While four bending parts are formed on either of both dipole parts for the size of 53 mm horizontal by 7 mm vertical as shown in FIG. 4, the number of bending parts will be increased to five or six, and so on, as an antenna becomes smaller.

As described thus far, the present invention is contrived to enable a provision of a tag-use antenna and a tag which allow a minimal change of a communication distance depending on a body to be attached to by using an extremely compact antenna.

What is claimed is:

1. A tag-use antenna comprising a dipole antenna, a feed part and an inductance part formed by a conductor in the same flat plane, wherein
   the feed part is formed at the center of the dipole antenna and is able to mount a chip,
   the inductance part is connected to the feed part in parallel with a dipole of the dipole antenna, and
   the dipole antenna is formed in a rectangular spiral by being bent inward from both ends at bending parts which bend the dipole at least in four places respectively, with the entire length of each of the bending parts of the four places being shorter than one half of a resonance wavelength of the antenna when the bending parts are extended to a straight line, wherein
   the four bending parts are formed on either of both dipole parts for a size of 53 mm horizontal by 7 mm vertical,
   a number of bending parts is increased to more than four to make the dipole smaller.

2. The tag-use antenna according to claim 1, wherein
   the inductance part is formed in the neighborhood of the center of the dipole antenna, and placed in the middle of the dipole antenna.

3. The tag-use antenna according to claim 1, wherein
   the entire length of the antenna and said inductance part are adjusted to make an impedance of a tag at a reader/writer operation frequency of 953 MHz nearly become optimum antenna value, wherein a reflectance between the chip and the dipole antenna is small.

4. The tag-use antenna according to claim 1, wherein
   said conductor is either copper, silver or aluminum.

5. The tag-use antenna according to claim 1, wherein
   said feed part is connected to a mounted large scale integration (LSI) chip.

6. A tag for sandwiching the tag-use antenna according to claim 5 which uses plastic resins or papers attached to both surfaces of the tag-use antenna.

7. The tag according to claim 6, wherein
   said plastic resins ethylene terephthalate films.

* * * * *